Jan. 24, 1967 V. W. PETERSON 3,300,004
SEQUENTIALLY ENGAGED CLUTCHES CONNECTED IN SERIES
AND COOLING MEANS THEREFOR
Filed Feb. 27, 1964 2 Sheets-Sheet 1

INVENTOR.
Victor W. Peterson
BY
A. M. Heiter
ATTORNEY

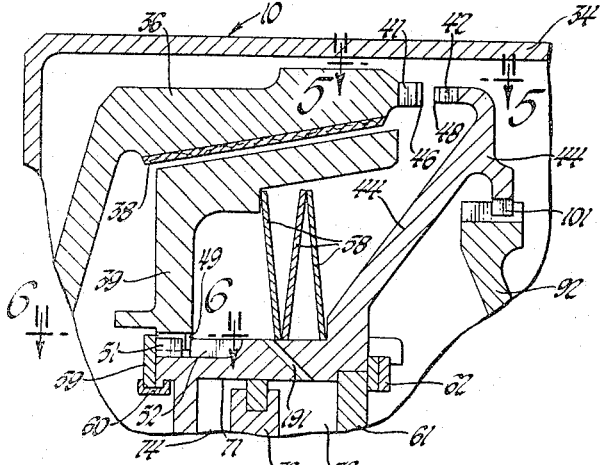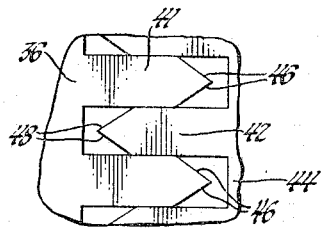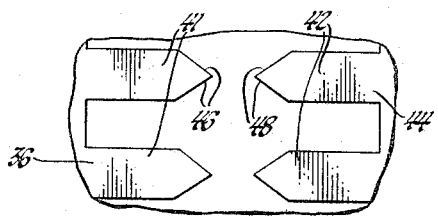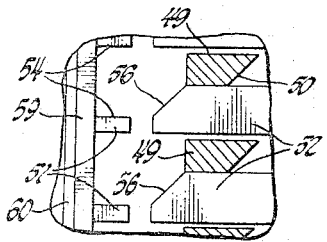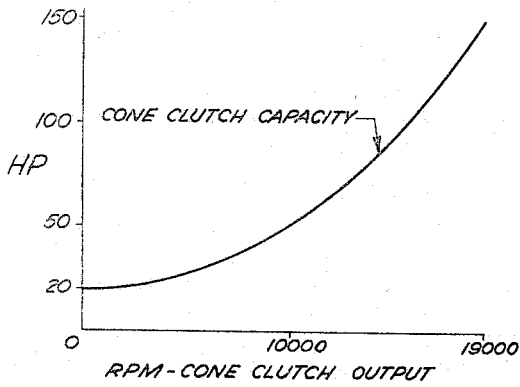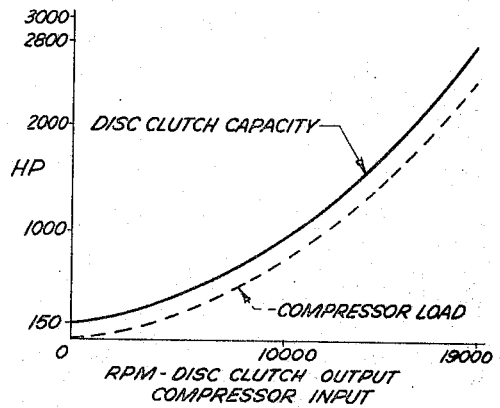

3,300,004
SEQUENTIALLY ENGAGED CLUTCHES CONNECTED IN SERIES AND COOLING MEANS THEREFOR
Victor W. Peterson, Indianapolis, Ind., assignor to General Motors Corporation, Detroit, Mich., a corporation of Delaware
Filed Feb. 27, 1964, Ser. No. 347,764
19 Claims. (Cl. 192—48)

This invention relates to drive transmitting assemblies and more particularly to drive transmitting assemblies employing hydraulically operated friction clutches and synchronizing mechanisms.

Constant efforts are being made, especially in the air transport field, to design improved drive transmitting assemblies employing hydraulically operated friction clutches and synchronizing mechanisms for coupling a prime mover such as a turbo-prop engine to a load such as an auxiliary compressor which is utilized to supply boundary layer air to the aircraft surfaces. Among the problems faced by the designers are those of keeping the starting drag in the clutches to a minimum, keeping the heat generated in the clutches during engagement to a minimum and providing simple and efficient synchronizing mechanisms to bring a driven member into synchronization with a driving member prior to positive engagement of these members. It is generally known that the major factor controlling the size of the clutch used is the heat generation rate, since the torque input to the clutch during slipping engagement over that required to accelerate the load must be dissipated. Since this energy dissipation is by the release of heat in the clutch, the clutch must be of sufficient size in friction area to provide for the conduction of this heat without adversely affecting the clutch structure throughout the torque range. It is a general rule that the larger heat generation, the larger the clutch size and necessarily the weight.

In such drive transmitting applications where the loads to be driven are large and variable, and the prime mover is delivering essentially constant torque throughout the speed range during clutch engagement, the clutch sizes may be held to a minimum if the heat generation rate is held to a minimum throughout the clutch engaging operation during acceleration. In addition, in applications where the loads to be driven are large, it has been found that useful energy can be prevented from being wasted if the rotative masses and drag of the clutches utilized to transmit drive to the load are held to a minimum during the intervals when no torque is transmitted and upon initial acceleration. Furthermore, in applications where the loads are large and the speed ranges are high, it has been found that if coolant to the clutch is provided at varying flow rates to aid in the lubrication of the clutch and in the transfer of heat from the clutch during clutch disengaged running, clutch fully engaged running and the slip engagement period, the useful range of the clutch can be extended. It is also advantageous that the synchronizing mechanisms be highly reliable and simple in structure.

This invention, as illustrated in one embodiment, employs a synchronizing cone clutch of relatively small power capacity and a disc clutch of relatively large power capacity, which are hydraulically operated and in series relationship with each other, for transmitting drive from a turbo-prop engine to an axial flow compressor which is unthrottled and which supplies air under pressure for boundary layer control of aircraft surfaces. Input from the prime mover is to the driving member of the cone clutch and output from the cone clutch is from the driven member of the cone clutch to the driving member of the disc clutch. Output to the final load is by the driven member of the disc clutch.

When both clutches are disengaged, only the driving member of the cone clutch rotates and no power is transmitted to the load. This permits the driving friction plates in the disc clutch to remain stationary when the load is not being driven to prevent heat buildup in the disc clutch prior to engagement and to keep the rotative masses of both the cone clutch and disc clutch during disengaged running at a minimum. When it is desired to transmit torque to the final load, a cone clutch control valve is operated to deliver a predetermined fluid pressure to a cone clutch apply motor rotatable with the cone clutch driven member and to deliver fluid to lubricate and cool the cone clutch only during its slip engagement period. The piston of the cone clutch apply motor in response to this fluid pressure acts through Belleville type diaphragm springs to urge the cone clutch driven member into engagement with the cone clutch driving member. This piston also acts as a coupling member to drivingly connect the cone clutch driven member to the disc clutch driving member and to an auxiliary pump for the disc clutch and the combination of the Belleville springs and the predetermined fluid pressure is sufficient to effect initial rotation of the cone clutch driven member, the coupling member, the disc clutch driving member and the driving member of the auxiliary pump. The centrifugal fluid pressure developed in the cone clutch apply motor and which started at zero centrifugal pressure increases with the speed of the cone clutch driven member to provide an increasing cone clutch output power characteristic with speed sufficient to accelerate the cone clutch driven member and connected members including the disc clutch driving member and the driving member of the auxiliary pump while the disc clutch is disengaged. This centrifugal fluid pressure provides sufficient cone clutch engaging forces for accelerating the cone clutch load during its slip engagement period, but not excessive, to maintain the power absorbed and the heat thus generated to a minimum. Blocker and coupling splines on the cone clutch driven member and coupling member prevent the engagement of lockup coupling splines on the cone clutch driving member and coupling member prior to the cone clutch driven member approaching the synchronous speed, and upon approaching the synchronous speed, permit the lockup coupling splines to lock up the cone clutch.

At the synchronous speed of the cone clutch and with the coupling member permitted to move fully into locked up engagement with the cone clutch driving member by their blocker and coupling spline connection, lubricant and coolant flow to the cone clutch is blocked by the coupling member, which also operates a disc clutch control valve. This valve at the synchronous speed opens a fluid delivery passage to permit fluid pressure from the auxiliary pump to be delivered to disc clutch apply motors which are rotatable with the disc clutch driven member. This fluid is maintained at a predetermined line pressure sufficient to effect initial engagement of the disc clutch and cause initial rotation of the disc clutch driven member and the connecting compressor load. A disc clutch lubricant and coolant control valve having motor means responsive to a spring biasing force, and the predetermined disc clutch line pressure acting in one of two chambers which are rotatable with the disc clutch driven member and the centrifugal pressures produced in both chambers, is operative to admit a limited and small amount of fluid from the auxiliary pump to lubricate and cool the disc clutch when the disc clutch is disengaged to minimize viscous drag during disengaged disc clutch running and during fully engaged disc clutch running when lubricant and coolant requirements are low and to admit a large quantity of fluid during the slip engagement period when heat generation is high. The load characteristics of the axial flow compressor when unthrottled follow an increasing horsepower curve with speed and the disc clutch apply motors are utilized to develop a centrifugal fluid pressure to give the disc clutch an increasing output power characteristic with speed just slightly ahead of the load characteristics of the compressor being driven to provide, like in the cone clutch, sufficient clutch engagement forces to accelerate the compressor, but not excessive, to maintain the power absorbed and heat generated in the disc clutch at a minimum. Disengagement of the drive is accomplished by operating the cone clutch control valve to communicate the fluid in the cone clutch apply motor with exhaust and to deliver fluid under pressure to a cone clutch release motor. This causes the coupling member to move out of its locked up engagement with the cone clutch driving member to permit disengagement of the cone clutch and operates the disc clutch control valve to close the delivery passage communicating fluid pressure from the auxiliary pump with the disc clutch apply motors. The disc clutch, along with the compressor, then slows down reducing the auixiliary pump speed and the centrifugal pressures in the disc clutch apply motors and finally, when the disc clutch output speed approaches a low speed so that the centrifugal fluid pressures are overcome by disc clutch release springs, the disc clutch apply pistons are moved by the release springs to release the disc clutch.

An object of this invention is to provide an improved drive transmitting assembly.

Another object of this invention is to provide an improved drive transmitting assembly employing friction clutches and a synchronizing mechanism.

Another object of this invention is to provide an improved drive transmitting assembly employing hydraulically operated friction clutches having increasing output power characteristics with increasing output speed and minimum heat generation during acceleration.

Another object of this invention is to provide a synchronizing first clutch in series relationship with a second clutch and fluid motor means and control means operative to engage the first clutch and, at a predetermined speed, engage the second clutch and to provide in the first and second clutches an increasing power characteristic with speed.

Another object of this invention is to provide a first clutch in series relationship with a second clutch of larger power capacity and a synchronizing mechanism for positively interconnecting the driving and driven members of the first clutch at the synchronous speed prior to engagement of the second clutch.

Another object of this invention is to provide a selectively and hydraulically operated first clutch in series relationship with a hydraulically operated second clutch of larger power capacity and a synchronizing mechanism for positively interconnecting the driving and driven members of the first clutch at the synchronous speed and a second clutch control valve responsive to admit fluid under pressure to the clutch apply motors of the second clutch when the driven member of the first clutch reaches synchronous speed to engage the second clutch and a lubricant and coolant valve operative in response to biasing forces including a spring force, a predetermined line pressure and a differential centrifugal fluid pressure dependent on the speed of the driven member of the second clutch to deliver a limited and small amount of fluid to lubricate and cool the second clutch during disengagement and full engagement and a large amount of fluid during the slip engagement period.

Another object of this invention is to provide a selectively and hydraulically operated first clutch in series relationship with a second clutch of larger power capacity and a synchronizing mechanism for positively interconnecting the driving and driven members of the first clutch at the synchronous speed and a control valve operative in response to the driven member of the first clutch reaching synchronous speed and correspondingly the driving member of the second clutch reaching this same speed to admit fluid at a predetermined pressure to the clutch apply motors of the second clutch to engage this clutch to effect initial output rotation with subsequent accelerative engaging forces by centrifugal pressure and a lubricant and coolant control valve operative in response to biasing forces including a spring force, the predetermined line pressure and centrifugal fluid pressures which are dependent on the speed of the driven member of the second clutch to permit a small amount of fluid to be supplied to the second clutch during disengaged running and full engaged running and a large quantity of fluid during the slip engagement period to lubricate and cool the second clutch.

Another object of this invention is to provide a small power capacity clutch in series relationship with a large power capacity clutch and a fluid motor operative in response to fluid at a predetermined pressure to engage the small power capacity clutch to effect initial output rotation of the small power capacity clutch with subsequent accelerative engagement forces by centrifugal pressure and a pump driven by the driven member of the small power capacity clutch for delivering fluid at a predetermined pressure via a control valve to fluid motors effective to initially engage the large power capacity clutch to effect inital final output rotation when the driven member of the small power capacity clutch reaches its synchronous speed and the driving member of the large power capacity clutch reaches this same speed with subsequent accelerative engaging forces for the large power capacity clutch being by centrifugal pressure which increases with final output speed.

Another object of this invention is to provide a small power capacity clutch in series relationship with a large power capacity clutch and a fluid motor operative in response to fluid under pressure to engage the small power capacity clutch for initial output rotation with the centrifugal fluid pressure developed in this clutch motor providing an increasing output power capacity with increasing output speed of the small power capacity clutch and just slightly ahead of the load characteristics of the members being driven by the small power capacity clutch to provide sufficient clutch engagement forces for acceleration, but not excessive, to maintain the power absorbed and the heat generated at a minimum, and fluid motor means operative in response to fluid at a predetermined pressure to engage the large power capacity clutch at the synchronous speed of the small power capacity clutch for initial final output rotation and to provide a centrifugal fluid pressure with increasing output speed of the large power capacity clutch to give the large power capacity clutch an increasing output power capacity with speed just slightly ahead of the load characteristics of the load being driven to provide sufficient clutch engagement forces for acceleration, but not excessive, to maintain the power absorbed and heat generated at a minimum.

Another object of this invention is to provide a drive transmitting assembly for transmitting drive from a prime mover to a final load employing a cone clutch of relatively small power capacity and a disc clutch of relatively large power capacity in series relationship with each other, and a fluid motor operable in response to fluid at a predetermined pressure to effect engagement of the cone clutch to initially rotate the connected cone clutch load with subsequent engagement by centrifugal pressure to accelerate the cone clutch load with fluid being delivered to lubricate and cool the cone clutch only during slip engagement, and a synchronizing mechanism for positively interconnecting the driving and driven members of the cone clutch at the synchronous speed, with an auxiliary pump and the driving member of the disc clutch being connected to be driven conjointly with the driven member of the cone clutch, and opposed fluid motors operable in response to delivery of fluid at a predetermined pressure from the auxiliary pump to engage the disc clutch to initially rotate the final load upon the driven member of the cone clutch reaching the synchronous speed whereby the driving member of the disc clutch reaches this same speed with subsequent disc engagement by centrifugal pressure to accelerate the final load, and a lubricant and coolant control valve having motor means operable in response to biasing forces including a spring force, the predetermined line pressure and different centrifugal fluid pressures dependent on the speed of the driven member of the disc clutch effective to deliver a small amount of fluid to lubricate and cool the disc clutch during full engaged running and disengaged running and a large quantity of fluid during the slip engagement period, with the cone clutch and disc clutch each having an increasing output power characteristic with speed slightly ahead of the loads they drive provided by the centrifugal fluid pressures in their fluid motors which are dependent on the rotative speed of the driven member of the cone clutch and the driven member of the disc clutch, respectively.

These and other objects will be more apparent from the following description and drawing of the preferred embodiment of the invention.

FIGURE 2 is an enlarged view of parts of the cone clutch shown in FIGURE 1 and shows the cone clutch disengaged.

FIGURE 3 is an enlarged partial section on the line 3—3 of FIGURE 1 showing the lockup coupling splines on the cone clutch driving member and the coupling member in their engaged position.

FIGURE 4 is an enlarged partial section on the line 4—4 in FIGURE 1 showing the blocker and coupling splines on the cone clutch driven member and the coupling member in a position permitting engagement of the lockup coupling splines on the cone clutch driving member and coupling member.

FIGURE 5 is the same view as FIGURE 3 showing the lockup coupling splines disengaged.

FIGURE 6 is the same view as FIGURE 4 showing the blocker and coupling splines in a position to prevent engagement of the lockup coupling splines on the cone clutch driving member and coupling member.

FIGURE 7 shows a plot of the power capacity of the cone clutch vs. r.p.m. of the cone clutch driven member.

FIGURE 8 shows a plot of the power capacity of the disc clutch in solid line and the load characteristics of the driven load in dashed lines vs. the r.p.m. of the disc clutch driven member and connected load.

A drive transmitting assembly embodying features of this invention has a wide range of usefulness. The preferred embodiment illustrated is adapted to drivingly connect a prime mover, such as a turbo-prop engine to an axial flow auxiliary compressor which supplies boundary layer air to aircraft surfaces and permits the auxiliary compressor to be picked up and accelerated without throttling the inlet to the compressor. It is understood, of course, that this invention can be used in other applications having other prime movers and other loads.

Figure 1:
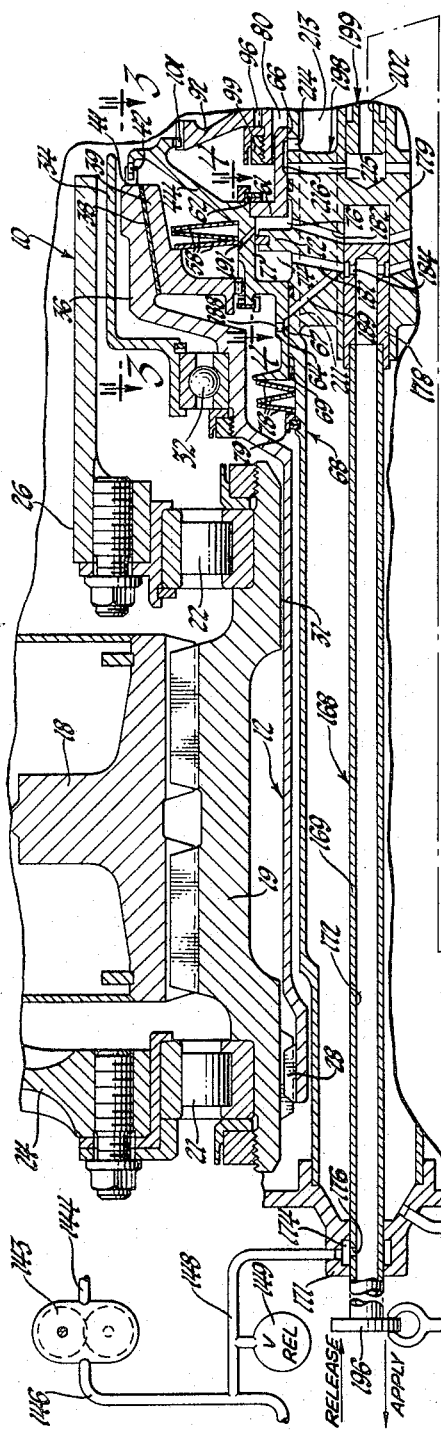
FIGURE 1 is a vertical, longitudinal, sectional view through a drive transmitting assembly embodying one form of the invention which employs a cone clutch in series relationship with a disc clutch and shows the cone clutch and disc clutch engaged.
Figure 1:
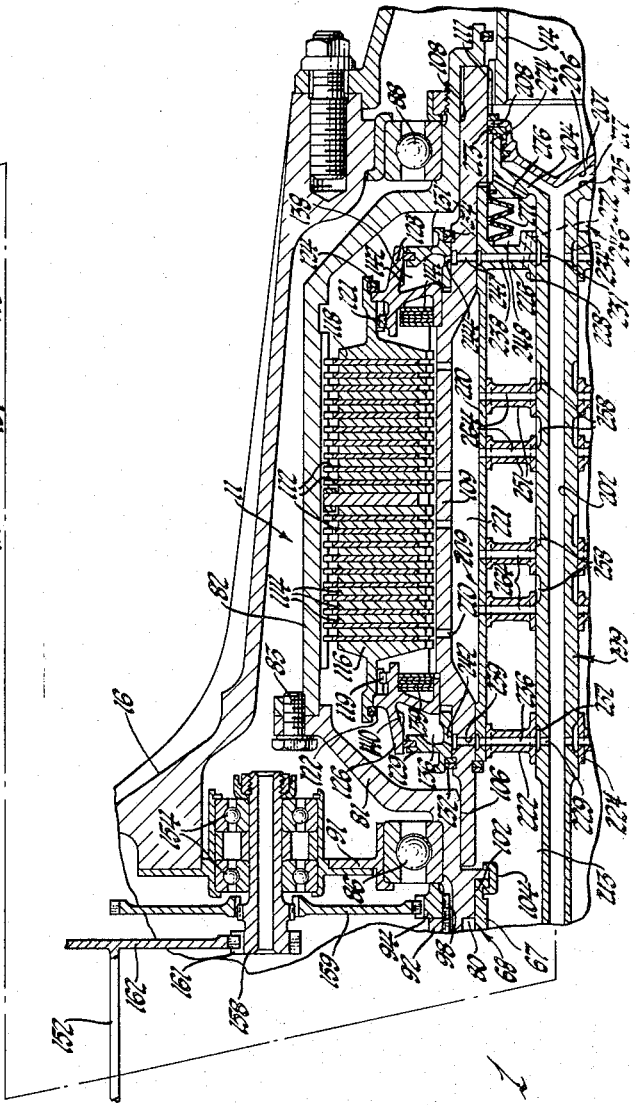

Referring now to FIGURE 1, the drive transmitting assembly employs a synchronized cone clutch generally designated at 10 in series relationship with a disc clutch generally designated at 11 for transmitting drive from a power input sleeve shaft 12 to a final power output sleeve shaft 14 drivingly connected to an unthrottled axial flow auxiliary compressor (not shown) which supplies boundary layer air to aircraft surfaces. The cone clutch 10 and disc clutch 11 are mounted in a housing 16 which rotatably supports a herringbone toothed bull gear adapted to be driven through reduction gearing by the power output shaft of the turbo-prop engine, not shown. Gear 18 meshes with a small herringbone toothed gear 19 which is rotatably supported by axially aligned anti-friction bearings 21 and 22, the bearings 21 and 22 being mounted in fixed bearing support members 24 and 26, respectively, rigidly secured to the housing 16. Gear 19 is splined at 28 to the left-hand end of shaft 12 and drives this shaft at a speed higher than the speed of the gear 18 as determined by the gear ratio of the step up gear set provided by gears 18 and 19.

Shaft 12 is freely received through a bore 31 in the right-hand end of gear 19 and is rotatably supported by an anti-friction bearing 32 which is mounted in a hub 34 fixed to the housing 16. Internal of hub 34 is an annular cone clutch driving member 36 integral with shaft 12. The cone clutch driving member 36 has a friction facing 38 and engageable with this friction facing is an annular cone clutch driven member 39.

As best shown in FIGURES 2, 3 and 5, the cone clutch driving member 36 has circumferentially spaced axially extending lockup coupling splines 41 engageable with corresponding splines 42 which are provided on a coupling member 44, with these splines 41 and 42 having on their opposite sides intersecting flat ramp portions 46 and 48, respectively.

As best shown in FIGURES 2, 4 and 6, the cone clutch driven member 39 has a single row of radially inwardly extending blocker and coupling splines 49 extending circumferentially therearound engageable with two axially spaced rows of radially outwardly extending blocker and coupling splines 51 and 52 which are integral with the coupling member 44 to drivingly connect members 39 and 44. Splines 49 each have a ramp portion 50, splines 51 have a rectangular cross section having a flat side 54 and the splines 52 are each provided with a flat ramp portion 56 having a ramp angle equal to that of ramp portions 50 of splines 49 and inclined relative to the flat sides 54 of splines 51. The operation of the splines 41 and 42 and the splines 49, 51 and 52 will be explained in detail later.

When the cone clutch 10 is fully disengaged, as shown in FIGURE 2, cone clutch engaging springs 58, which are Belleville type diaphragm springs, compressed between coupling member 44 and the driven member 39 yieldingly hold the splines 49 of driven member 39 against a stop ring 59 which is retained on coupling member 44 by a U-shaped snap ring 60. By this arrangement, the driven member 39 is yieldingly held in the position shown relative to coupling member 44 and out of engagement with driving member 36.

An annular cone clutch motor member 61, which also serves as a disc clutch control valve element as will be explained later, is secured by retaining rings 62 to coupling member 44, and coupling member 44 and motor member 61 have axially aligned bores 64 and 66, respectively, freely receiving an enlarged diameter portion 67 of an oil transfer bushing 68. Coupling member 44 is splined at 69 to bushing 68 and this spline connection permits axial movement of coupling 44 and motor member 61 relative to bushing 68 and prevents relative rotation between the coupling member 44 and motor member 61 and the bushing 68. Coupling member 44 has a counterbore 71 to receive an annular divider 72 integral with bushing 68. Motor member 61 closes the counterbore 71 and the divider 72 divides the counterbore 71 into a cone clutch apply chamber 74 to provide the cone clutch apply motor and a release chamber 76 to provide the cone clutch release motor with suitable seals being provided to prevent excessive fluid leakage from these chambers. The coupling member 44 serves as a piston to initially engage the cone clutch when fluid under pressure is admitted to the apply chamber 74 and to permit release of the cone clutch when fluid under pressure is admitted to the release chamber 76.

Cone clutch release springs 78, which are diaphragm springs of the Belleville type, compressed between a stop ring 79 fixed against further leftward movement on bushing 68 and the extreme left-hand end of coupling member 44 urge coupling member 44 to the right relative to bushing 68 to the cone clutch release position shown in FIGURE 2 which corresponds to disengagement of the cone clutch. This release position is determined by the right-hand end of motor member 61 bottoming out on the bottom 80 of a counterbore in a drum hub 81.

Disc clutch 11 employs a drum or disc clutch driving member 82 fixed by bolts 83 to the drum hub 81. Hub 81 and driving member 82 are rotatably supported in the housing 16 by axially aligned anti-friction bearings 86 and 88, respectively, with the bearing 86 being mounted in a bearing support member 91 fixed to the housing 16. The bearing 88 is mounted in the right-hand end of housing 16.

A drive transmitting member 92 and a gear 94 are splined at 96 and 98, respectively, to hub 81 and member 92, gear 94 and bearing 86 are clamped against a shoulder of hub 81 by a lock ring 99 to prevent axial movement relative to hub 81. Coupling member 44 is slidably splined at 101 to drive member 92 and this spline connection permits slidable axial movement of coupling member 44 relative to drive transmitting member 92. Hub 81 has a counterbore 102 to receive and support the enlarged diameter portion 67 of the bushing 68. A U-shaped snnap ring 104 engages radially inwardly extending flange portions of the bushing 68 and the hub 81 and prevents relative axial movement between the bushing 68 and hub 81.

Rotatably mounted in axially aligned counterbores 106 and 108 of the hub 81 and disc clutch driving member 82, respectively, is a disc clutch driven member 109 which is splined at 111 to the output shaft 14. To transmit drive between the disc clutch driving member 82 and the disc clutch driven member 109, there are provided a plurality of friction plates 112 and a plurality of interleaved clutch plates 114, each friction plate being provided with suitable friction facings. The friction plates 112 are splined at their outer radius to the interior of driving member 82 and the clutch plates 114 are splined at their inner radius to driven member 109 in any suitable known manner. Axially opposed pressure plates 116 and 118 slidably splined at their inner radius to the member 109 engage the outermost friction plates 112 and are fixed by spline connections 119 and 121 and by stop rings 122 and 124 to annular piston members 126 and 128, respectively. Piston members 126 and 128 are closely fitted and slidably mounted on smooth outer diameter portions of driven member 109 and annular backing plates 129 and 131, respectively. The backing plates 129 and 131 are closely fitted on smooth reduced diameter portions of member 109 and are retained on this member by stop rings 132 and 134, respectively. The piston member 126 and backing plate 129 and the piston member 128 and backing plate 131 define annular disc clutch apply chambers 136 and 138, respectively, to provide the disc clutch apply motors. The piston members 126 and 128 function to pack the plates 112 and 114 together in frictional engagement between the pressure plates 116 and 118 to apply the disc clutch under balanced load conditions when fluid pressure is supplied to the opposed apply chambers 136 and 138.

Diaphragm springs 139 of the Belleville type compressed between piston member 126 and an abutment on the member 109 and diaphragm springs 141 also of the Belleville type compressed between piston member 128 and another abutment on the member 109 yieldingly hold the piston members in their clutch release positions when fluid pressure is no longer supplied to apply chambers 136 and 138. Bleed slots 140 and 142 in piston members 126 and 128, respectively, allow any residual fluid in the apply chambers to be drained off when the piston members are in their release positions to prevent premature clutch actuation.

*Fluid supply*

Fluid pressure for operating the apply motors of the cone clutch 10 is supplied by a positive displacement gear type pump 143 which in this embodiment is the pump utilized to supply oil pressure to the lubricating system of the turbo-prop gear reduction drive, and this pump is driven at a speed proportional to that of the power output shaft of the turbo-prop engine. When pump 143 is operating, fluid is drawn via a suction line 144 from a sump, not shown, and is discharged under pressure into a main supply line 146 for delivery to the gear reduction drive and to a branch supply line 148 for delivery to the cone clutch. In line 148 is a pressure relief valve 149 which controls the pressure in this line to provide a predetermined pressure for cone clutch engagement. The operation of these lines in connection with the cone clutch will be more completely covered later.

Fluid pressure for operating the apply motors of the disc clutch 11 is supplied by an auxiliary positive displacement gear type pump 151. This pump which has its driving gear driven by a pump drive shaft 152 is connected to be driven at a speed proportional to that of the cone clutch driven member 39. For that purpose, the bearing support member 91 has axially aligned anti-friction bearings 154 rotatably supporting a countershaft 158. The gear 94, which rotates at the same speed as driven member 39, meshes with a first transfer gear 159 fixed to shaft 158, and a second transfer gear 161 smaller than gear 159 integral with shaft 158 meshes with a larger gear 162 integral with pump drive shaft 152. Gears 94 and 159 are approximately the same size and the pump drive shaft 152 is driven at a lower speed than coupling member 44 by the step-down drive ratio provided by this gear train. When the driving impeller of this pump is revolved by shaft 152, fluid is drawn via a suction line 164 from a sump, not shown, and is discharged under pressure into a disc clutch supply line 166. The operation of the disc clutch in response to the supply of this fluid pressure in line 166 will be more completely covered later. In line 166 is a pressure relief valve 167 which controls the pressure in this line to provide a predetermined pressure for disc clutch engagement.

*Manual cone clutch control valve*

Fluid pressure supplied by the pump 143 to branch supply line 148 is communicated with the cone clutch apply chamber 74 and the release chamber 76 by the manual cone clutch control valve designated generally at 168. Valve 168 employs a cone clutch valve sleeve 169 slidably and rotatably supported and closely fitted at its left-hand end in aligned bores of a cap member 171 which is rigidly fixed to the housing 16. Sleeve 169 has a central bore 172 and this bore is closed at its left-hand end. The left-hand terminal end of the bushing 68 is also closely fitted in and rotatably supported by the cap member 171 with the cap member closing the left-hand end of this bushing. Cap member 171 has an annular chamber 174 adjacent the sleeve 169 to which the branch supply line 148 is connected and a port 176 in sleeve 169 connects chamber 174 to the bore 172 in all positions of the valve 168.

A closed end cylindrical valve element 178 fixed to the right-hand end of sleeve 169 having its closed bore aligned with bore 172 is slidably supported and closely fitted in a blind bore in a cone clutch supply manifold 179 integral with the enlarged portion 67 of bushing 68. Manifold 179 has delivery passages 181 and 182 connecting the blind bore to chambers 74 and 76, respectively, and the valve element 178 has delivery ports 184 connectable via an annular groove in the valve element 178 with passages 181 and 182 to selectively communicate fluid pressure in the bore 172 with these chambers to either engage or release the cone clutch.

Ports 188 in the hub of coupling member 44 align with lubricant and coolant delivery passages 189 connected to delivery passages 181 when coupling member 44 is positioned for slipping cone clutch engagement to deliver fluid to lubricate and cool the cone clutch. When coupling member 44 is in its locked up condition with driving member 36 as shown in FIGURE 1 and there is no cone clutch slip, the coupling member 44 blocks the coolant delivery passages 189.

Orifices 191 in coupling member 44 connect release chamber 76 to the interior of the cone clutch in all positions of the coupling member 44 and, in addition to exhausting release chamber 76 when fluid is no longer supplied to release the cone clutch by delivery passages 182, keep the release chamber 76 drained of leakage fluid during cone clutch engagement to prevent centrifugal pressure buildup. The orifices 191 restrict the passage of fluid to a sufficient extent during fluid pressure supply to release chamber 76 to effect movement of the coupling member 44 to its release position. The operation of these fluid passages and ports will be more completely covered later.

Maneuvering of the valve 168 to apply and release the cone clutch is accomplished by a manual lever 192 pivotal about a pivot pin 194 mounted on the housing 16 with the lever 192 having a forked end engaging a collar 196 integral with that portion of the sleeve 169 which projects beyond the left-hand end of cap member 171.

*Disc clutch control valve*

Fluid pressure supplied by auxiliary pump 151 is communicated with the disc clutch apply chambers 136 and 138 by the disc clutch control valve designated generally at 198 and includes the cone clutch motor member 61 which also serves as a disc clutch control valve element. A lubricant and coolant control valve element 199 whose operation will be explained in detail later having a central bore 202 has its left-hand end closely fitted and slidably supported in a closed bore in cone clutch supply manifold 179 opposite the closed bore containing the cone clutch valve element 178. The right-hand end of valve element 199 has a radially extending annular wall section 204 having a concave surface 205 opposed to the convex surface 206 of a cap member 207 which is splined at 208 to the disc clutch driven member 109. A disc clutch supply manifold generally designated at 209 has a cylindrical sleeve 210 fixed to rotate with driven member 109. Wall section 204 of valve element 199 is slidably mounted in a bore in the right-hand end of sleeve 210 and on a guide surface provided on cap member 207 and seals are provided to prevent excessive fluid leakage past these sliding surfaces. Apertures 211 in manifold 179 connect the interiors of bushing 68 and manifold sleeve 210 and with the left-hand outboard end of bushing 68 closed by cap 171 and the right-hand end of manifold 209 closed as will be explained in more detail later, there is provided a disc clutch supply chamber generally designated at 213. The supply line 166 is connected through the cap member 171 with the chamber 213 and the fluid under pressure in this chamber is employed to engage and to lubricate and cool the disc clutch.

The cone clutch supply manifold 179 has supply ports 214 open to chamber 213 and delivery passages 215 open to the left-hand end of the blind bore receiving the valve element 199. An internal annular groove 216 in member 61 which is conjointly movable with coupling member 44 connects ports 214 to passages 215 to communicate the fluid in chamber 213 with bore 202 in valve element 199 when coupling member 44 is in its locked up condition as shown in FIGURE 1 which occurs at the synchronous speed of the cone clutch. Prior to lock up the member 61 blocks passages 215 to prevent fluid communication between chamber 213 and the bore 202.

The disc clutch supply manifold 209 separates the chamber 213 and an annular lubricant and coolant delivery chamber 221 which is bounded by the manifold sleeve 210 and the driven member 109.

For communicating fluid pressure to apply chamber 136 the disc clutch supply manifold 209 at its left-hand end has radially extending and circumferentially spaced pipes 222 having their outer ends fixed to the sleeve 210 and their inner ends integral with a central common hub 224 which has a bore receiving the valve element 199. For communicating fluid pressure to the apply chamber 138, the manifold 209 has a wall section 226 integral with manifold sleeve 210 extending radially inward and terminating in a central hub 228 which also has a bore receiving the valve element 199. The wall section 226 closes the right-hand end of manifold 209 to provide the right-most boundary to chamber 213.

Fluid pressure in the bore 202 communicates with the chambers 136 and 138 via ports 229 and 231 and elongated angular grooves 232 and 234, respectively, in valve element 199; passages 236 and 238 in pipes 222 and wall section 226, respectively, and the manifold sleeve 210; passages 239 and 241, respectively, in driven member 109; and ports 242 and 244 in the base portion of backing plates 129 and 131, respectively. Grooves 232 and 234 connect ports 229 and 231 to passages 236 and 238, respectively, in all positions of the valve element 199 to provide communication of fluid pressure to chambers 136 and 138, respectively, irrespective of movement of valve element 199.

*Lubricant and coolant control valve*

Fluid to lubricate and cool the disc clutch is admitted by a lubricant and coolant control valve denoted generally at 246 and includes the valve element 199 and supply manifold 209. The wall section 226 bordering the supply chamber 213 in cooperation with the manifold sleeve 210 and inboard side of the annular wall section 204 of valve element 199 defines a control chamber 248 separated from supply chamber 213 by the wall section 226. Manifold 209 has four axially spaced rows of manifold pipes 251 arranged in spoke-like fashion about the axis of this manifold and the inner and outer ends of these pipes terminate in inner and outer annular hubs. The outer hubs are secured to the manifold sleeve 210 and the inner hubs have axially aligned bores receiving the valve element 199. Fluid in chamber 213 circulating about the valve element 199 and the manifold pipes is communicated with the lubricant and coolant delivery chamber 221 via elongated external annular supply grooves 258 in valve element 199 and pipe and sleeve delivery passages 264. Fluid received in chamber 221 is then delivered via orifices 270 in driven member 109 to lubricate and cool the disc clutch.

Springs 271 of the Belleville type located in chamber 248 and compressed between the wall section 204 of valve element 199 and an abutment on the manifold sleeve 210 urge the valve element 199 rightwardly to a limited fluid flow position which is determined by the right-hand and outermost edge of wall section 204 engaging a stop ring 273 on cap member 207. In this position the pipe and sleeve passages 264 are partially cracked or opened to permit only a small amount of flow, and this occurs when the disc clutch is disengaged. These pipe and sleeve passages are also partially cracked when the disc clutch is fully engaged and are fully open to permit a large amount of flow during the slip engagement period, as will be subsequently explained.

Supply chamber 213 is connected to chamber 248 by circumferentially spaced passages 272 in the wall section 226 and the chamber 248 is connected to an annular exhaust chamber 274 by circumferentially spaced exhaust passages 276 in wall section 204. Exhaust passages 276 are connected at their inner ends to the chamber 248 at points near chamber 248's inner diameter and extend radially outward to connect at their outer ends with the exhaust chamber 274 which exhausts to the sump of the auxiliary pump.

When fluid pressure is present in supply chamber 213 and the delivery passages 215 of the disc clutch control valve 198 are blocked and thus the disc clutch is disengaged and the driven member 109 at rest, the passages 272 deliver fluid from chamber 213 to the control chamber 248 where it is then exhausted so that the springs 271 provide the only rightwardly acting biasing force under these conditions to bias the valve element 199 to the right to its limited flow position.

When fluid pressure in chamber 213 is delivered to apply the disc clutch apply motors this fluid pressure is also delivered by the bore 202 to a chamber 277 which is bounded on opposite sides by the concave surface 205 of wall section 204 and the convex surface 206 of cap member 207. The predetermined fluid pressure acting in chamber 277 is effective to move valve element 199 to the left to its full flow supply position against the biasing force of springs 271 to fully open the pipe and sleeve passages 264 in the manifold 209 to the chamber 213 to provide maximum lubricant and coolant supply to the disc clutch. Upon increasing speed of the driven member 109 as the disc clutch is engaged, the sum total of the spring force of springs 271 and the resulting centrifugal fluid pressure of the fluid trapped radially outward of the entrance to the exhaust passages 276 in chamber 248 approaches the sum total of the predetermined fluid pressure in chamber 277 and the resulting centrifugal fluid pressure in chamber 277 since the outer diameter of chamber 248 is larger than that of chamber 277. At a speed slightly below the synchronous or rated speed of the disc clutch, the former sum total of the forces acting rightwardly exceeds the latter sum total of the forces acting leftwardly and the valve element 199 is moved to the right to the limited flow supply position.

*Operation*

To illustrate the operation of the subject drive assembly, it is assumed for illustrative purposes that the unthrottled axial flow compressor to be driven by the output shaft 14 is to be rotated at 19,000 r.p.m. with the compressor absorbing at this speed in the neighborhood of 2550 horsepower at 65° F. With these design parameters the cone clutch 10 is selected to have a rated horsepower capacity of approximately 150 horsepower for transmitting sufficient torque to accelerate the disc clutch driving member 82 up to the cone clutch synchronous speed which is thus set at 19,000 r.p.m. and to accelerate the driving gear of the auxiliary pump 151, and the disc clutch 11 is selected to have a rated capacity of approximately 2800 horsepower for transmitting sufficient torque to accelerate the compressor up to 19,000 r.p.m.

With the turbo-prop engine in operation and the cone clutch control valve 168 in a position admitting fluid pressure in line 148 to release chamber 76, this fluid pressure, in cooperation with the release springs 78, holds coupling 44 in its release position shown in FIGURE 2, and only the cone clutch driving member 36 rotates and at a speed of 19,000 r.p.m. which has been predetermined by the step-down gear train including gears 18 and 19 connecting the turbo-prop engine to the cone clutch driving member 36. Therefore, when the axial flow compressor is not being operated there are no clutches engaged and the heat generated in the driving assembly is thus held to a minimum. Since there is no lubricant and coolant flow to the cone clutch during cone clutch disengaged running, there is no viscous drag in the cone clutch to absorb useful energy. With coupling member 44 held in its release position by cone clutch release springs 78 and the fluid pressure in release chamber 76, the clutch engaging springs 58 in their most extended position yieldingly hold splines 49 of the cone clutch driven member 39 against the stop ring 59 and the cone clutch driven member 39 in a disengaged position out of engagement with friction facing 38 of the cone clutch driving member 36 as shown in FIGURE 6. The splines 42 of the coupling member 44 do not engage the splines 41 of the cone clutch driving member 36 as shown in FIGURE 5, when coupling member 44 is in its release position.

When it is desired to pick up and accelerate the compressor to its operating speed of 19,000 r.p.m., the cone clutch control valve 168 is moved to a position to communicate fluid pressure in branch supply line 148 with the apply chamber 74. This fluid pressure has a predetermined value as determined by the relief valve 149 and acts in apply chamber 74 to urge coupling member 44 to the left to an apply position where the ramp portions 56 of splines 52 engage the ramp portions 50 of splines 49. In this coupling member position springs 58 act to urge driven member 39 against friction facing 38 to engage the cone clutch and the splines 49 by their engagement with the flat sides 54 of splines 51 transmit torque to the coupling member 44. The ports 188 are aligned with the coolant delivery passages 189 in this coupling member position and thus fluid is delivered to cool the cone clutch during slip engagement. The fluid pressure acting in apply chamber 74 has a value sufficient to transmit approximately 20 horsepower at the instant of apply as shown by the graph in FIGURE 7, which is that horsepower necessary to effect initial rotation of the driving impeller of auxiliary pump 151 and the disc clutch driving member 82. The orifices 191 exhaust the release chamber 76 and keep this chamber drained of any leakage fluid while the cone clutch is being engaged to prevent centrifugal pressure buildup in release chamber 76 and full benefit is obtained from the centrifugal fluid pressure developed in the clutch apply chamber 74 as the cone clutch driven member 39 accelerates to give the cone clutch an increasing torque or power capacity with speed as shown by the curve in FIGURE 7 to accelerate the disc clutch driving member 82 up to the synchronous speed and to accelerate the driving gear of the auxiliary pump 151. Since the centrifugal fluid pressure is proportional to the square of the speed of the cone clutch driven member 39, the slope of the curve gradually increases with speed and the rated capacity of 150 horsepower is reached at 19,000 r.p.m. which is the synchronous speed.

Splines 41 and 42 are held out of engagement by the splines 49 and 52 until synchronous speed is approached in the cone clutch. The ramp angle of the flat ramp portions 50 on splines 49 and the flat ramp portions 56 on splines 52 in combination with the coefficient of friction and cone angle of the cone clutch 10 is such that the dynamic inertia torque of the driven member 39 acts to hold the splines 49 against the flat sides 54 of splines 51 and the ramp portions 50 and 56 in engagement to prevent the engagement of splines 41 and 42 until the synchronous speed is approached, and this dynamic inertia torque is relieved wherein only drag torque of the disengaged disc clutch 11 and the driving gear of the auxiliary pump 151 remain. When this dynamic inertia torque is relieved, the fluid pressure in apply chamber 74 causes the splines 52, acting through their flat ramp portions 56, to ride down the flat ramp portions 50 of splines 49 and assume the position shown in FIGURE 4 whereby the coupling member 44 is thus moved leftward to its lockup position shown in FIGURE 1 and the splines 41 and 42 engage, as shown in FIGURE 3, to provide lockup of the coupling member 44 with the driving member 36 to transmit the large power requirements to accelerate and drive the compressor. The intersection of the ramp portions 46 and 48 of splines 41 and 42, respectively, provide a ramp angle to prevent positive lockout. In this coupling member position the coolant delivery passages 189 are blocked by the coupling member 44 since lubricant and coolant flow are no longer needed.

As the coupling member 44 is caused to rotate by engagement of the cone clutch driven member 39 with the friction facing 38 of the cone clutch driving member 36, the disc clutch driving member 82 is caused to rotate and the driving gear of the auxiliary pump 151 is caused to rotate and supply a fluid pressure to the supply chamber 213. Prior to synchronous speed in the cone clutch being reached, the delivery passages 215 of the disc clutch control valve 198 are blocked by member 61. The disc clutch driven member 109 remains stationary and thus the disc clutch apply motors remain stationary while the disc clutch driving member 82 is being accelerated along with the cone clutch driven member 39 by the engagement of the cone clutch 10. The fluid in chamber 213 under these conditions is delivered to the chamber 248 where it is then exhausted by the exhaust passages 276 so that the springs 271 maintain the lubricant and coolant valve element 199 in its limited flow supply position. Therefore, only a small amount of fluid is supplied to the disc clutch by the manifold 209 for lubrication and cooling while the disc clutch is not engaged and thus the viscous drag is low while the disc clutch driving member 82 is being accelerated and the disc clutch driven member 109 remains stationary.

At the synchronous speed and with the coupling member 44 moved to the left to its lockup position where it is positively locked by the splines 41 and 42 to the cone clutch driving member 36, the member 61 is moved sufficiently to the left to communicate the supply chamber 213 with the bore 202 and thus with the disc clutch apply chambers 136 and 138.

Upon delivery of fluid pressure to the chambers 136 and 138, engagement of the disc clutch is initiated. The fluid pressure supplied, as determined by the relief valve 167, is sufficient to apply the disc clutch pack with a force effective to transmit 150 horsepower which is that horsepower necessary to effect initial rotation of the disc clutch driven member 109 and the rotatable blades of the compressor. As the disc clutch apply motors are caused to rotate by engagement of the disc clutch pack, the centrifugal fluid pressure developed in the chambers 136 and 138 which is proportional to the square of the speed of the disc clutch driven member 109, gives the disc clutch an increasing torque or power capacity with speed as shown in FIGURE 8 by the solid line curve which has a gradually increasing slope. The disc clutch power capacity is sufficiently ahead of the horsepower absorbed by the axial flow compressor, whose horsepower absorption is proportional to the square of the speed and follows the dashed line curve in FIGURE 8 which runs parallel to the disc clutch power capacity curve, so that the compressor load is accelerated. Thus, at any given speed of the compressor the disc clutch apply forces are kept to a minimum and this occurs throughout the slip engagement period since the disc clutch power capacity parallels the compressor load.

When fluid pressure is initially supplied to the disc clutch apply motors, this predetermined apply fluid pressure is also supplied to the chamber 277 where it acts to move the valve element 199 to the left to its full flow supply position against only the biasing force of springs 271 since fluid pressure in chamber 248 is exhausted of all fluid pressure at this instant of time. Thus, the pipe and sleeve passages 264 are fully open to provide maximum flow to lubricate and cool the disc clutch when maximum slip occurs in the disc clutch.

The initial engagement of the disc clutch causes the control chamber 248 and chamber 277 to rotate since these chambers are rotatable with the disc clutch driven member 109. The outer diameter of chamber 248 is larger than that of chamber 277 to the extent that at a speed slightly lower than the synchronous speed for the disc clutch the combination of the centrifugal fluid pressure of the fluid trapped in chamber 248 radially outward of the entrances to exhaust passages 276 and spring force of springs 271 acting on the wall section 204 causes valve element 199 to move to the right against the centrifugal fluid pressure and the predetermined fluid pressure in chamber 277 to return valve element 199 to its limited flow supply position. Thus, during the disc clutch slip engagement period there is maximum lubricant and coolant flow and when synchronous speed is approached by the driven member 109, the valve element 199 has been returned to its limited flow supply position, as shown in FIGURE 1, and only a small amount of fluid is again allowed to flow through the lubricant and coolant supply passages to keep the viscous drag low.

Disengagement is accomplished by moving the cone clutch valve sleeve 169 to the right to communicate fluid pressure in bore 172 with the release chamber 76 and block delivery of fluid pressure to apply chamber 74. The fluid pressure in release chamber 76 urges coupling member 44 to the right toward its release position and initially forces the fluid in apply chamber 74 to leak past the seal between bore 64 and enlarged diameter portion 67 of bushing 68 to ports 188 to exhaust. Continued rightward movement of coupling member 44 toward its release position in response to fluid pressure in release chamber 76 brings ports 188 into alignment with passages 189 which are connected to passages 181 to complete the exhaust of apply chamber 74 to permit uninhibited movement of coupling member 44 to its release position. As coupling member 44 moves to the right from its lockup position, splines 41 and 42 disengage and delivery passages 215 which communicate chamber 213 with the disc clutch apply motors are closed by member 61. The disc clutch along with the compressor then slows down reducing the speed of auxiliary pump 151 and thus the fluid pressure in supply chamber 213 and disc clutch apply chambers 136 and 138. When the speed of the driven member 109 approaches a low value so that the centrifugal fluid pressure in chambers 136 and 138 is below a predetermined value, the disc clutch release springs 139 and 141 cause the piston members 126 and 128 and thus the pressure plates 116 and 118, respectively, to move to their disengaged positions. The bleed slots 140 and 142 of piston members 126 and 128, respectively, allow the residual fluid in the chambers 136 and 138 to drain off. All members of the drive assembly are then in their proper positions for the next engagement cycle.

The above-described preferred embodiment is illustrative of the invention which may be modified within the scope of the appended claims:

I claim:
1. In a drive transmitting device,
  (a) drive transmitting means having first clutch means and second clutch means operatively connected in series,
  (b) said first clutch means being normally disengaged and operable when engaged to provide a power path for transmitting drive to said second clutch means having a power capacity which increases with increasing output speed of said first clutch means,
  (c) lockup means operable to lock up said first clutch means subsequent to slipping engagement in said first clutch means,
  (d) and said second clutch means having a larger rated power capacity than said first clutch means and being normally disengaged and having clutch operating means operable to automatically engage said second clutch means subsequent to said first clutch means being locked up and provide said second clutch means with a power capacity which increases with increasing output speed of said second clutch means.

2. In a drive transmitting device,
  (a) drive transmitting means having first clutch means and second clutch means operatively connected in series,
  (b) said first clutch means having a relatively small rated power capacity and being normally disengaged and being operable when engaged to provide a power path for transmitting drive to said second clutch means having a power capacity proportional to the square of the output speed of said first clutch means, (c) lockup means operable to lock up said first clutch means subsequent to slipping engagement in said first clutch means, (d) and said second clutch means having a relatively large power capacity and being normally disengaged and having clutch operating means operable to automatically engage said second clutch means when said first clutch means is locked up and provide said second clutch means with a power capacity proportional to the square of the output speed of said second clutch means.

3. In a drive transmitting device, (a) first clutch means including first driving means and first driven means operable when engaged to provide a drive between said first driving means and said first driven means, (b) second clutch means of larger power capacity than said first clutch means including second driving means and second driven means operable when engaged to provide a drive between said second driving means and said second driven means, (c) said first driven means being drivingly connected to said second driving means, (d) lockup means operable to lock said first driven means to said first driving means when said first driving means and said first driven means are operating at the same speed, (e) and clutch operating means operable to engage said second clutch means only after said first driven means is locked to said first driving means.

4. In a drive transmitting device, (a) input means and output means, (b) first clutch means driven by said input means, second clutch means of larger rated power capacity than said first clutch means driven by said first clutch means when said first clutch means is engaged, said output means being driven by said second clutch means when said second clutch means is engaged, (c) said first clutch means having lockup means operable to lock up said first clutch means at the conclusion of slipping engagement in said first clutch means, (d) and clutch operating means operatively connected to said first clutch means and said second clutch means operable to first engage said first clutch means and then apomatically engage said second clutch means only when said first clutch means is locked up by said lockup means.

5. In a drive transmitting device, (a) input means and output means, (b) first clutch means and second clutch means operatively connected in series operable when engaged to transmit drive from said input means to said output means and when normally disengaged to interrupt drive from said input means to said output means, (c) said first clutch means having clutch operating means operable to engage said first clutch means to provide drive from said input means through said first clutch means to said second clutch means and operable to condition said first clutch means for a synchronized operating condition, (d) lockup means operable to lock up said first clutch means when said first clutch means obtains said synchronized operating condition, (e) and said second clutch means being of larger rated power capacity than said first clutch means and having clutch operating means controlled by said lockup means operable to engage said second clutch means in response to said first clutch means obtaining said synchronized operating condition and being locked up by said lockup means to provide a final drive through said second clutch means to said output means.

6. In a drive transmitting device, (a) drive transmitting means including first clutch means and second clutch means, (b) said first clutch means having first driving means and first driven means operable when engaged and said first driving means is being driven to accelerate said first driven means to the speed of said first driving means, (c) said first clutch means having lockup means operable to lock said first driven means to said first driving means when said first driven means and said first driving means are operating at the same speed, (d) said second clutch means being of larger rated power capacity than said first clutch means and including second driving means and second driven means, said second driving means being drivingly connected to said first driven means, said second clutch means being operable when engaged and said second driving means is being driven by said first driven means to accelerate said second driven means to the speed of said second driving means, (e) and clutch operating means operable to first engage said first clutch means whereby said first driven means is accelerated to the speed of said first driving means and said first clutch means operates at synchronous speed and said lockup means locks said first driven means to said first driving means, and secondly to automatically engage said second clutch means only after said first driven means is locked to said first driving means to accelerate said second driven means to the speed of said second driving means.

7. In a drive transmitting device, (a) drive transmitting means including first clutch means and second clutch means, (b) said first clutch means including first driving means and first driven means operable when engaged and said first driving means is being driven to accelerate said first driven means to the speed of said first driving means, (c) lockup means including synchronizing means operable to synchronize the speeds of said first driven means and said first driving means and then to positively lock said first driven means to said first driving means, (d) said second clutch means having a larger rated power capacity than said first clutch means and including second driving means and second driven means, said second driving means being drivingly connected to said first drive means, said second clutch means being operable when engaged and said second driving means is being driven by said first driven means to accelerate said second driven means to the speed of said second driving means, (e) and clutch operating means operable to first engage said first clutch means whereby said first driven means is accelerated to the speed of said first driving means and said first clutch means operates at synchronous speed and said lockup means positively locks said first driven means to said first driving means, and secondly to automatically engage said second clutch means only after said first clutch means is locked up to accelerate said second driven means to the speed of said second driving means.

8. In a drive transmitting device, (a) first clutch means including first driving means and first driven means, said first clutch means being operable when engaged and said first driving means is being driven to accelerate said first driven means to the speed of said first driving means, (b) lockup means operable to positively lock said first driven means to said first driving means at the synchronous speed of said first clutch means, (c) second clutch means having a larger rated power capacity than said first clutch means and including second driving means and second driven means, said first driven means being drivingly connected to said second driving means, said second clutch means being operable when engaged and said second driving means is being driven by said first driven means to accelerate said second driven means to the speed of said second driving means, (d) and clutch operating means operable to engage said first clutch means first and to provide said first clutch means with a power capacity which increases with the speed of said first driven means to accelerate said first driven means to the speed of said first driving means and at the synchronous speed of said first driving means and upon said first driven means being locked to said first driving means to engage said second clutch means and provide said second clutch means with a power capacity which increases with the speed of said second driven means to the speed of said second driving means.

9. In a drive transmitting device,
(a) first clutch means including first driving means and first driven means, said first clutch means being operable when engaged and said first driving means is being driven to accelerate said first driven means to the speed of said first driving means,
(b) said first clutch means having lockup means operable to positively lock said first driven means to said first driving means at the synchronous speed of said first clutch means,
(c) second clutch means having a larger rated power capacity than said first clutch means and including second driving means and second driven means, said first driven means being drivingly connected to said second driving means, said second clutch means being operable when engaged and said second driving means is being driven by said first driven means to accelerate said second driven means to the speed of said second driving means,
(d) clutch operating means including first clutch operating means operable to engage said first clutch means first and provide said first clutch means with a power capacity which increases with the speed of said first driven means to accelerate said first driven means and connected said second driving means to the speed of said first driving means,
(e) and second clutch operating means controlled by said lockup means operable to automatically engage said second clutch means when said first driven means is locked to said first driving means and provides said second clutch means with a power capacity which increases with the speed of said second driven means to accelerate said second driven means to the speed of said second driving means.

10. In a drive transmitting device,
(a) input means and a load,
(b) first clutch means including first driving means and first driven means, said input means being drivingly connected to said first driving means, said first clutch means being operable when engaged and said first driving means is being driven by said input means to accelerate said first driven means to the speed of said first driving means,
(c) said first clutch means having lockup means operable to positively lock said first driven means to said first driving means at the synchronous speed of said first clutch means,
(d) second clutch means having a larger rated power capacity than said first clutch means and including second driving means and second driven means, said first driven means being drivingly connected to said second driving means, said second driven means being drivingly connected to said load, said second clutch means being operable when engaged and said second driving means is being driven by said first driven means to accelerate said second driven means and connected load to the speed of said second driving means,
(e) and clutch operating means operable to engage said first clutch means first and provide said first clutch means with a power capacity proportional to the square of the speed of said first driven means to accelerate said first driven means and connected said second driving means to the speed of said first driving means and at the synchronous speed of said first driving means and upon said first driven means being locked to said first driving means to automatically engage said second clutch means and provide said second clutch means with a power capacity proportional to the square of the speed of said second driven means and connected load.

11. A drive transmitting assembly comprising,
(a) first clutch means including rotatable first driving means and rotatable first driven means operable when engaged and said first driving means is being rotated to transmit power from said first driving means to said first driven means to rotate said first driven means,
(b) first clutch operating means operable to engage and disengage said first clutch means,
(c) said first clutch means having lockup means operable to lock said first driven means to said first driving means when said first driven means is caused to rotate at the same speed as said first driving means by the operation of said first clutch operating means,
(d) second clutch means of larger rated power capacity than said first clutch means including rotatable second driving means and rotatable second driven means operable when engaged and said second driving means is being rotated to transmit power from said second driving means to said second driven means to rotate said second driven means, said first driven means being drivingly connected to said second driving means,
(e) said second clutch means having fluid motor means including clutch apply chamber means fixed for rotation with said second driven means, said fluid motor means being operable when said clutch apply chamber means is supplied with fluid under pressure to engage said second clutch means,
(f) a fluid control system for said fluid motor means including a source of fluid, motor supply passage means, a pump operatively drivingly connected to said first driven means operable when driven to receive fluid from said source and deliver this fluid under pressure to said motor supply passage means, pressure control means operable to control the fluid pressure in said motor supply passage means to a predetermined pressure, motor delivery passage means connected to said clutch apply chamber means, a control valve operatively connected to said lockup means operable to communicate the fluid in said motor supply passage means with said motor delivery passage means and connected said clutch apply chamber means only when said first driven means is locked to said first driving means,
(g) and said fluid motor means being operable when said clutch apply chamber means is initially supplied with the fluid at said predetermined pressure by said fluid control system, to effect engagement of said second clutch means and initial rotation of said second driven means and to develop a centrifugal pressure head proportional to the square of the speed of said second driven means to accelerate said second driven means to the speed of said second driving means.

12. In a drive transmitting assembly,
(a) clutch means including rotatable driving means and rotatable driven means operable when engaged and said driving means is being rotated to transmit power from said driving means to said driven means to rotate said driven means, (b) clutch operating means operable to engage and disengage said clutch means, (c) and a lubricant and coolant control system having fluid at a predetermined pressure operable to automatically deliver fluid at one predetermined delivery rate to lubricate and cool said clutch means when said clutch means is disengaged, and to automatically deliver fluid at a greater predetermined rate to lubricate and cool said clutch means when said clutch means is engaged and clutch slip occurs, and to automatically deliver fluid at said one predetermined delivery rate to lubricate and cool said clutch means when said driven means is at a speed slightly lower than the speed of said driving means and when said driving means and said driven means are at the same speed.

13. In a drive transmitting assembly, (a) clutch means including rotatable driving means and rotatable driven means operable when engaged and said driving means is being rotated to transmit power from said driving means to said driven means to rotate said driven means, (b) clutch control means operable to control engagement and disengagement of said clutch means, (c) a lubricant and coolant control system for said clutch means including a source of fluid at a predetermined pressure, supply passage means, first valve means operatively connected to said clutch control means operable to connect said supply passage means to said source when said clutch control means controls to engage said clutch means and blocking said supply passage means from said source when said clutch control means controls to disengage said clutch means, (d) delivery passage means for delivering fluid to lubricate and cool said clutch means, (e) second valve means for connecting said supply passage means to said delivery passage means, said second valve means including a valve element movable between a first position and a second position, said valve element in said first position permitting a predetermined delivery rate of fluid to be supplied from said supply passage means to said delivery passage means and in said second position permitting a larger predetermined delivery rate of fluid to be supplied from said supply passage means to said delivery passage means, (f) said valve element having motor means including a first chamber and a second chamber fixed for rotation with said driven means, said first chamber being connected to said supply passage means, said second chamber being connected to said source and having exhaust means connected at its inner radius, (g) spring means prestressed to yieldingly hold said valve element in said first position, yieldingly resist movement of said valve element to said second position and urge return of said valve element from said second position to said first position, (h) said motor means being operable upon the delivery of the fluid at said predetermined pressure to said first chamber to move said valve element from said first position to said second position while said second chamber is exhausted by said exhaust means, (i) and the outer radius of said second chamber being greater than that of said first chamber to the extent that when the speed of said driven means is slightly lower than said driving means the combination of the centrifugal fluid pressure of the fluid trapped in said second chamber radially outward of said exhaust means and the spring force of said spring means exceeds the centrifugal fluid pressure and predetermined pressure of said fluid in said first chamber and returns said valve element to said first position.

14. In a drive transmitting assembly, (a) clutch means including rotatable driving means and rotatable driven means operable when engaged and said driving means is being rotated to transmit power from said driving means to said driven means to rotate said driven means, (b) clutch control means operable to control engagement and disengagement of said clutch means, (c) a lubricant and coolant control system for said clutch means including a source of fluid at a predetermined pressure, supply passage means, (d) first valve means operatively connected to said clutch control means operable to connect said supply passage means to said source when said clutch control means controls to engage said clutch means and blocking said supply passage means from said source when said clutch control means controls to disengage said clutch means, (e) delivery passage means for delivering fluid to lubricate and cool said clutch means, (f) second valve means for connecting said supply passage means to said delivery passage means, said second valve means including a valve element movable between a partially open position corresponding to said delivery passage means being partially open to said supply passage means to provide a limited fluid delivery to lubricate and cool said clutch means and a fully open position corresponding to said delivery passage means being fully open to said supply passage means to provide maximum fluid delivery to lubricate and cool said clutch means, (g) said valve element having fluid motor means including a first chamber and a second chamber fixed for rotation with said driven means, said first chamber being connected to said supply passage means, said second chamber being connected to said source and having exhaust means connected at its inner radius, (h) spring means prestressed to yieldingly hold said valve element in said partially open position, yieldingly resist movement of said valve element to said fully open position and urge return of said valve element from said fully open position to said partially open position, (i) said fluid motor means being operable upon the delivery of the fluid at said predetermined pressure to said first chamber to move said valve element from said partially open position to said fully open position against the spring force of said spring means while said second chamber is exhausted by said exhaust means, (j) and the outer radius of said second chamber being greater than that of said first chamber to the extent that when the speed of said driven means is slightly lower than that of said driving means the combination of the centrifugal fluid pressure of the fluid trapped in said second chamber radially outward of said exhaust means and the spring force of said spring means is effective to move said valve element against the centrifugal fluid pressure and said predetermined pressure of the fluid in said first chamber to return said valve element from said fully open position to said partially open position.

15. A drive transmitting assembly comprising, (a) first clutch means, operating means operable to engage and disengage said first clutch means, lockup means operable to lockup said first clutch means, (b) second clutch means of larger rated power capacity than said first clutch means including driving means operatively connected to said first clutch means and driven means frictionally engageable with said driving means, fluid motor means for operating on said driving and driven means to engage and disengage said second clutch means, (c) a fluid control system for controlling said fluid motor means including a source of fluid under pressure, a clutch control valve operatively connected to said lockup means operable to connect said fluid source to said fluid motor means only when said first clutch means is locked up, (d) and lubricant and coolant control means including a coolant control valve operable to deliver fluid from said fluid source to lubricate and cool said second clutch means at a slow delivery rate in a first position and at a fast delivery rate in a second position, said coolant control valve having control motor means operatively connected to said fluid source and in fluid communication with the fluid delivered by said clutch control valve to said fluid motor means and fixed for rotation with said driven means, said control motor means operable during disengagement of said second clutch means to hold said coolant control valve in said first position, said control motor means operable only during engagement of said second clutch means to hold said coolant control valve in said second position until the speed of said driven means at least approaches the speed of said driving means and thereafter position said coolant control valve in said first position.

16. The drive transmitting assembly set forth in claim 15 and said coolant control valve including a movable valve member operable to both provide and maintain a connection between said fluid source and said fluid motor means and establish said slow and fast delivery rates for lubricating and cooling said second clutch means.

17. A drive transmitting assembly comprising,
(a) first clutch means having first driving means and first driven means frictionally engageable with said first driving means,
(b) coupling means, release spring means normally holding said coupling means in a clutch release position and resisting movement of said coupling means to a clutch apply position and a clutch lockup position,
(c) blocker and coupling splines for drivingly connecting said first driven means to said coupling means and permitting movement of said first driven means between a clutch engaged position and a clutch disengaged position to engage and disengage said first driving and driven means,
(d) said first driving means and said coupling means having lockup means operable to lock said coupling means to said first driving means when said coupling means is in said clutch lockup position,
(e) second clutch means of larger rated power capacity than said first clutch means including second driving means connected to said coupling means and second driven means frictionally engageable with said second driving means,
(f) spring means for normally holding said first driven means in said disengaged position when said coupling means is in said clutch release position and for moving said first driven means to said clutch engaged position upon movement of said coupling means from said clutch release position towards said clutch apply position with continued movement of said coupling means to said clutch apply position acting on said spring means to hold said first driven means in engagement with said first driving means,
(g) first clutch fluid motor means operable to move said coupling means to said clutch apply position and also to said clutch release position,
(h) a fluid control system for selectively delivering fluid at a predetermined pressure to engage said first clutch motor means, said first clutch fluid motor means upon initial fluid supply moving said coupling means to said clutch apply position to cause said spring means to apply an initial clutch apply force to rotate said first driven means with the fluid thereafter developing a centrifugal pressure head proportional to the square of the speed of said first driven means to provide an increasing clutch apply force,
(i) said blocker and coupling splines preventing movement of said coupling means by said first clutch fluid motor means to said clutch lockup position until the speed of said first driven means reaches the speed of said first driving means,
(j) and second clutch fluid motor means operatively connected to said lockup means operable to engage said second clutch means only after said coupling means is locked to said first driving means.

18. The drive transmitting assembly set forth in claim 17 and a fluid control system for said second clutch fluid motor means including a source of fluid, a pump driven by said coupling means operable to deliver fluid from said source under pressure, pressure control means operable to control the fluid pressure to a predetermined pressure, a clutch control valve operatively connected to said coupling means operable to deliver the fluid under pressure to said second clutch fluid motor means only when said coupling means is in said lockup position, and said second clutch fluid motor means operable on initial fluid supply to effect engagement of said second clutch means and initial rotation of said second driven means and provide a clutch apply force proportional to the square of the speed of said second driven means to accelerate said second driven means.

19. The drive transmitting assembly set forth in claim 18 and lubricant and coolant control means including a coolant control valve operable to deliver fluid from said fluid source to lubricate and cool said second clutch means at a slow delivery rate in a first position and at a fast delivery rate in a second position, said coolant control valve having control motor means operatively connected to said fluid source and in fluid communication with the fluid delivered by said clutch control valve to said second clutch fluid motor means and fixed for rotation with said second driven means, said control motor means operable during disengagement of said second clutch means to hold said coolant control valve in said first position, said control motor means operable only during engagement of said second clutch means to hold said coolant control valve in said second position until the speed of said second driven means at least approaches the speed of said second driving means and thereafter position said coolant control valve in said first position.

References Cited by the Examiner
UNITED STATES PATENTS

| | | | |
|---|---|---|---|
| 2,214,901 | 9/1940 | Griffin | 192—103 X |
| 2,375,783 | 5/1945 | Gilfillan | 192—48 X |
| 2,633,955 | 4/1953 | Allen et al. | 192—87 X |
| 2,893,525 | 7/1959 | McDowall et al. | |
| 3,024,885 | 3/1962 | Dence et al. | 192—87 X |
| 3,059,746 | 10/1962 | Christenson | 192—113.2 X |

DAVID J. WILLIAMOWSKY, *Primary Examiner.*

BENJAMIN W. WYCHE III, *Examiner.*